(12) United States Patent
Shin

(10) Patent No.: US 8,160,780 B2
(45) Date of Patent: Apr. 17, 2012

(54) SYSTEM AND METHOD FOR KEEPING A VEHICLE IN A LANE

(75) Inventor: Dong Ho Shin, Gyeonggi-do (KR)

(73) Assignee: Hyundai Motor Japan R&D Center, Inc., Seoul (KR)

( * ) Notice: Subject to any disclaimer, the term of this patent is extended or adjusted under 35 U.S.C. 154(b) by 658 days.

(21) Appl. No.: 12/328,963

(22) Filed: Dec. 5, 2008

(65) Prior Publication Data

US 2009/0157263 A1    Jun. 18, 2009

(30) Foreign Application Priority Data

Dec. 13, 2007    (KR) .................. 10-2007-0129793

(51) Int. Cl.
*B62D 5/00* (2006.01)
(52) U.S. Cl. ......................... 701/43; 180/204
(58) Field of Classification Search .............. 701/41, 701/43, 48, 23; 180/204, 401, 443, 446
See application file for complete search history.

(56) References Cited

U.S. PATENT DOCUMENTS

| | | | |
|---|---|---|---|
| 6,705,424 B2 * | 3/2004 | Ogawa et al. ............... | 180/446 |
| 7,565,947 B2 * | 7/2009 | Ogawa et al. ............... | 180/444 |
| 7,628,245 B2 * | 12/2009 | Osonoi et al. ............... | 180/405 |

FOREIGN PATENT DOCUMENTS

| | | |
|---|---|---|
| JP | 07-110712 | 4/1995 |
| JP | 2005-335632 | 12/2005 |

* cited by examiner

*Primary Examiner* — Dalena Tran
(74) *Attorney, Agent, or Firm* — Edwards Wildman Palmer LLP; Peter F. Corless, Esq.; Brian R. Landry, Esq.

(57) ABSTRACT

The present invention relates, in general, to a system and method for keeping a vehicle in a lane in consideration of a steering wheel contortion angle, and more particularly, to a system for keeping a vehicle in a lane in consideration of a steering wheel contortion angle, which estimates the path of a vehicle in consideration of a steering wheel contortion angle attributable to the distortion of a steering shaft, thus improving the safety and riding comfort of occupants.

16 Claims, 4 Drawing Sheets

[FIG. 1]
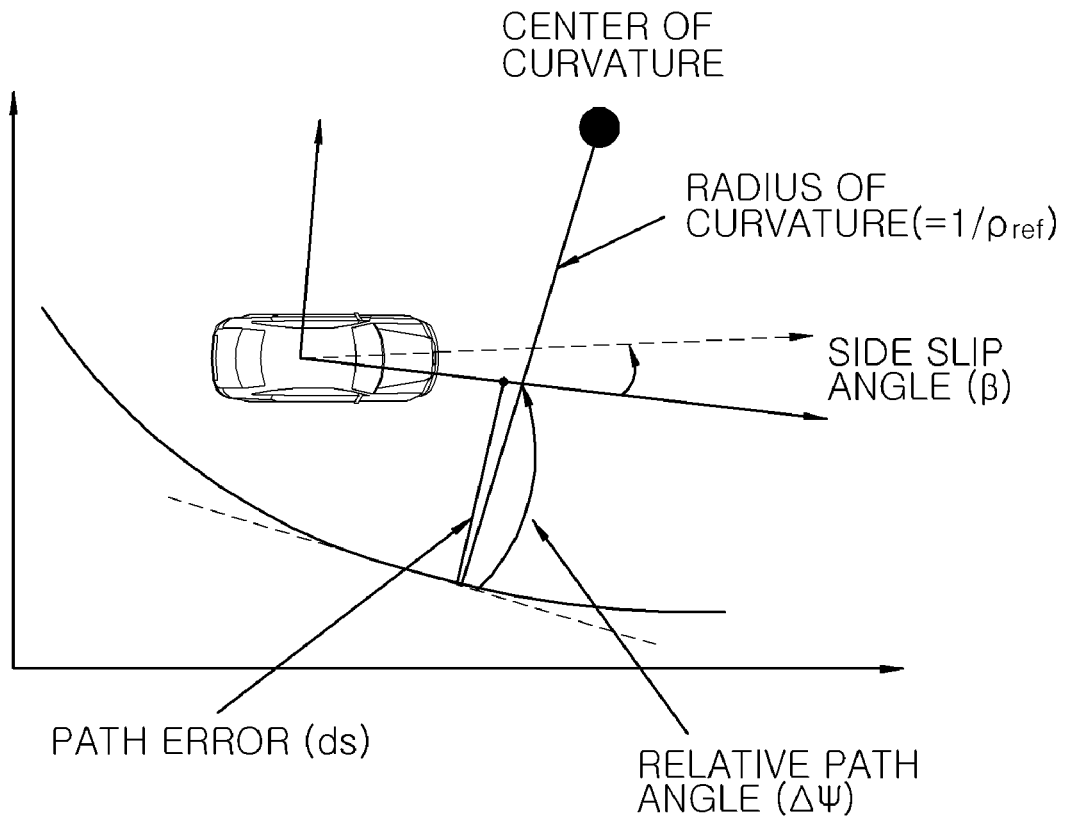

[FIG. 2]
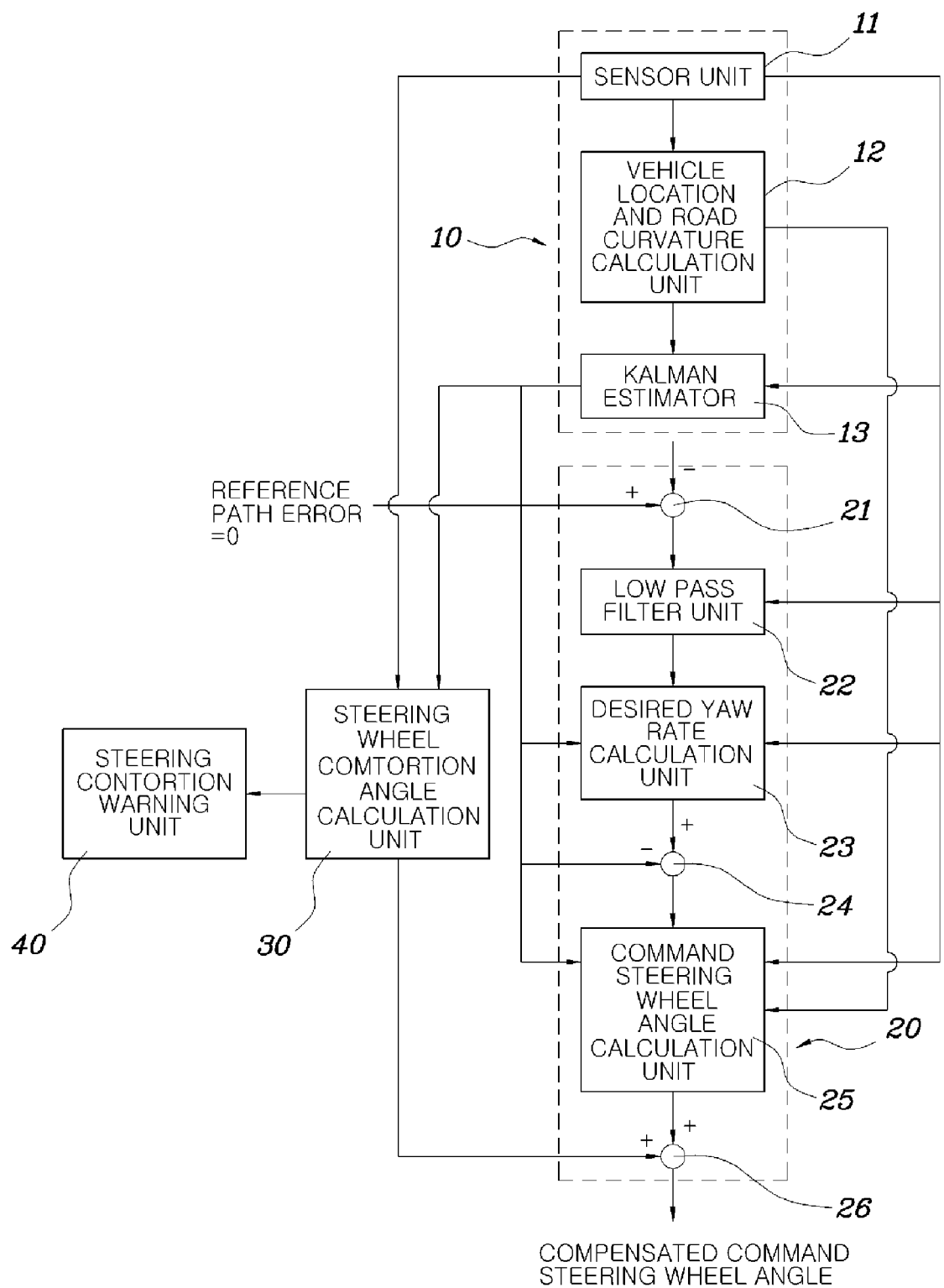

[FIG. 3]
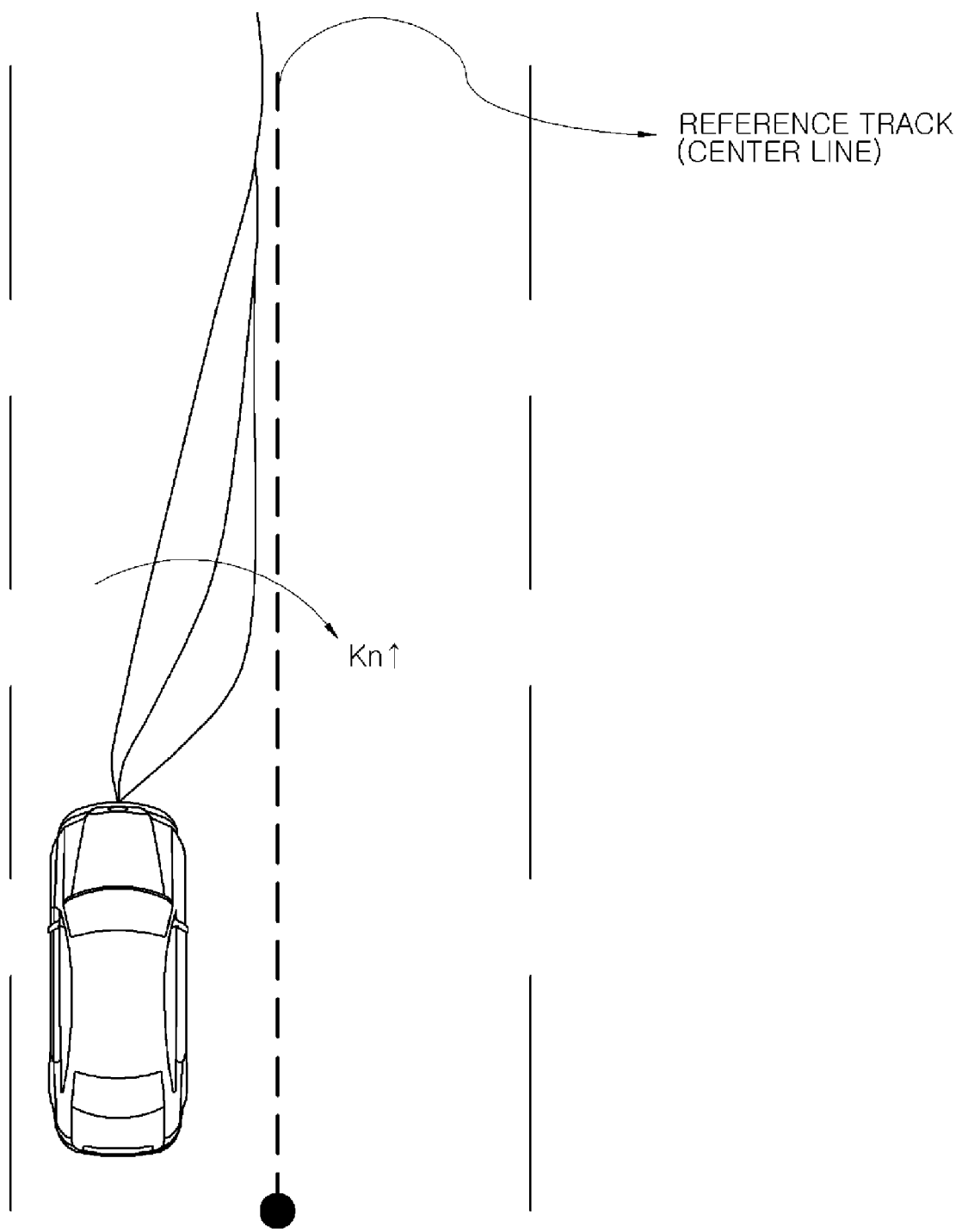

[FIG. 4]
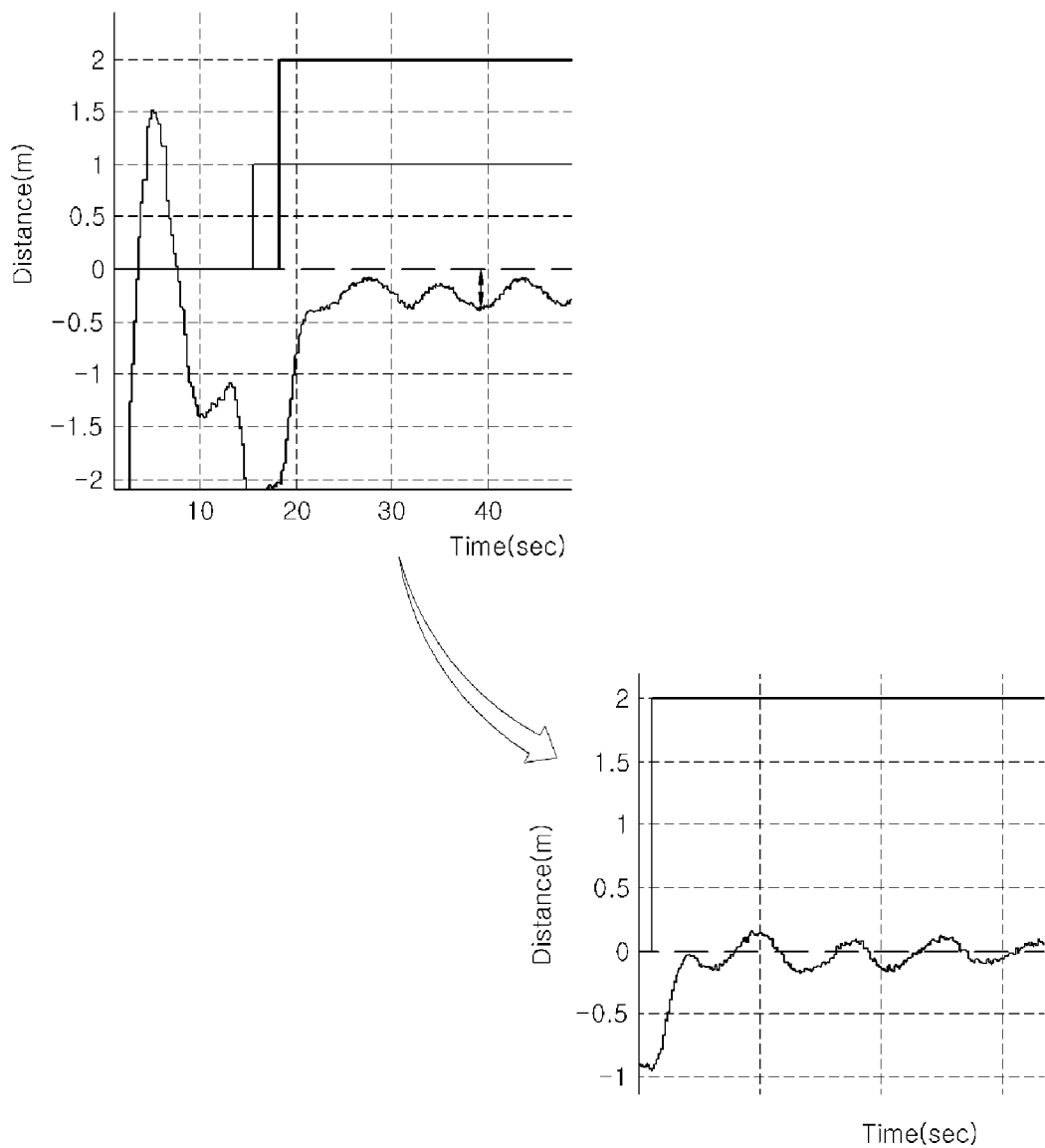

SYSTEM AND METHOD FOR KEEPING A VEHICLE IN A LANE

CROSS-REFERENCE TO RELATED APPLICATIONS

This application claims under 35 U.S.C. §119(a) priority to Korean Application No. 10-2007-0129793, filed on Dec. 13, 2007, the disclosure of which is incorporated herein by reference in its entirety.

BACKGROUND OF THE INVENTION

1. Field of the Invention

The present invention relates, in general, to a system designed to keep a vehicle within its lane. More particularly, the present invention relates to a system and method for keeping a vehicle in a lane in consideration the contortion angle of a steering wheel, where the angle of the steering wheel occurs due to the distortion of a steering shaft attributable to the vehicle aging or deteriorating durability.

2. Background Art

It can be the case that when a vehicle is used for a long period of time, the durability of certain components of the vehicle are weakened, and gradual deformation may occur in mechanical assembly of the components that were implemented in an initial production stage. In particular, for vehicle safety, steering wheel function may be important. It can be the case with a steering wheel that the steering wheel becomes distorted due to the aging of a vehicle. Consequently, a steering wheel contortion angle occurs due to such distortion of the steering wheel, and this distortion may also influence the steering control system, and thus result in errors in keeping the vehicle inside its lane.

The above information disclosed in this the Background section is only for enhancement of understanding of the background of the invention and therefore it may contain information that does not form the prior art that is already known in this country to a person of ordinary skill in the art.

SUMMARY OF THE INVENTION

In one aspect, the present invention provides a system and method for keeping a vehicle in a lane in consideration of a steering wheel contortion angle attributable to the distortion of a steering shaft.

In particular embodiments, the present invention preferably provides a system for keeping a vehicle within a lane in consideration of a steering wheel contortion angle, comprising an input information generation unit for measuring variables for dynamic characteristics of a vehicle, and suitably estimating information about lateral motion of the vehicle using the variables for dynamic characteristics of the vehicle; a steering wheel contortion angle calculation unit for calculating a steering wheel contortion angle $\delta_o$ using variables for dynamic characteristics of the vehicle and information about lateral motion of the vehicle, which are provided by the input information generation unit; and a control unit for suitably calculating a desired yaw rate $\gamma_d$ using variables for dynamic characteristics of the vehicle and information about lateral motion of the vehicle which are provided by the input information generation unit, and calculating a command steering wheel angle $\delta_{fo}$ using the desired yaw rate and the information about lateral motion of the vehicle, and generating a compensated command steering wheel angle, which is a sum of the command steering wheel angle and the steering wheel contortion angle which is provided by the steering wheel contortion angle calculation unit.

Preferably, in certain embodiments, the input information generation unit comprises a sensor unit for suitably measuring variables for dynamic characteristics of the vehicle; a vehicle location and road curvature calculation unit for calculating a location of the vehicle, a road curvature $\rho_{ref}$ and a path error $d_s$ using the variables for dynamic characteristics of the vehicle which are provided by the sensor unit; and a Kalman estimator for estimating information about lateral motion of the vehicle using the variables for dynamic characteristics of the vehicle which are provided by the sensor unit and the road curvature and the path error which are provided the vehicle location and road curvature calculation unit.

Preferably, in other certain embodiments, the variables for dynamic characteristics measured by the sensor unit include information about a road along which the vehicle is traveling, Global Positioning System (GPS) information of the vehicle, a speed of the vehicle V, a measured yaw rate of the vehicle $\gamma$, a steering wheel angle $\delta_f$, and a side slip angle $\beta$.

Preferably, in still other embodiments, information about lateral motion of the vehicle estimated by the Kalman estimator include the side slip angle $\beta$, the measured yaw rate of the vehicle $\gamma$, the path error $d_s$ and a relative path angle $\Delta\psi$.

Preferably, the Kalman estimator realizes an observer equation $$(\dot{\hat{x}} = (A - LC)\hat{x} + Bu + Ly)$$

that is suitably configured using a state equation ($\dot{x}=Ax+Bu$) represented by the following equation:

$$\begin{bmatrix} \dot{\beta} \\ \dot{\gamma} \\ \Delta\dot{\psi} \\ \dot{d_s} \end{bmatrix} = \begin{bmatrix} a_{11} & a_{11} & 0 & 0 \\ a_{11} & a_{11} & 0 & 0 \\ 0 & 1 & 0 & 0 \\ V & L_s & V & 0 \end{bmatrix} \begin{bmatrix} \beta \\ \gamma \\ \Delta\psi \\ d_s \end{bmatrix} + \begin{bmatrix} b_{11} & 0 \\ b_{21} & 0 \\ 0 & -V \\ 0 & 0 \end{bmatrix} \begin{bmatrix} \delta_f \\ \rho_{ref} \end{bmatrix}$$

the Kalman estimator receives the steering wheel angle $\delta_f$, the measured yaw rate of the vehicle $\gamma$ from the sensor unit and the road curvature $\rho_{ref}$, the path error $d_s$ from the vehicle location and road curvature calculation unit, and calculates estimated state variables by which values of a matrix (A–LC) are negative values, thus estimating the side slip angle $\beta$, the measured yaw rate of the vehicle $\delta$, the path error $d_s$ and the relative path angle $\Delta\psi$, where $$a_{11} = -\frac{C_f + C_r}{\tilde{m}V}, a_{12} = -1 + \frac{C_r L_r - C_f L_f}{\tilde{m}V^2}, a_{21} = \frac{C_r L_r - C_f L_f}{I_{zz}},$$

$$a_{22} = -\frac{C_r L_r^2 + C_f L_f^2}{I_{zz}V}, b_{11} = \frac{C_f}{\tilde{m}V}, \text{ and } b_{21} = \frac{C_f L_f}{I_{zz}}, \text{ and}$$

where constants of respective elements are defined as follows:

$C_f$: cornering stiffness of a front wheel shaft of the vehicle,
$L_f$: distance from a center of gravity of the vehicle to the front wheel shaft,
$C_r$: cornering stiffness of a rear wheel shaft of the vehicle,
$L_r$: distance from a center of gravity of the vehicle to the rear wheel shaft, V: vehicle speed, $\tilde{m}$: virtual vehicle weight (weight of vehicle (m)/road friction coefficient ($\mu$)), $L_s$: distance between the center of gravity of the vehicle and a GPS installed in the vehicle, $I_{zz}$: moment of inertia of the vehicle, $\delta_f$: steering wheel angle, and $\rho_{ref}$: lane curvature.

Preferably, in other further embodiments, the steering wheel contortion angle calculation unit calculates the steering wheel contortion angle using steering wheel angle $\delta_f$ which is provided by the sensor unit and the side slip angle $\beta$, the measured yaw rate of the vehicle $\gamma$ which are provided by the Kalman estimator.

Preferably, in still other further embodiments, the steering wheel contortion angle calculation unit calculates the steering wheel contortion angle using an observer equation $$\left( \dot{\hat{x}}_o = (A_o - L_o C_o)\hat{x}_o + B_o u_o + L_o y_o \right)$$

of a state equation ($\dot{x}_o = A_o x_o + B_o u_o$, where $y_o = C_o x_o = [0\ 1\ 0] x_o$) represented by the following equation:

$$\begin{bmatrix} \dot{\beta} \\ \dot{\gamma} \\ \dot{\delta}_o \end{bmatrix} = \begin{bmatrix} a_{11} & a_{12} & -b_{11} \\ a_{21} & a_{22} & -b_{21} \\ 0 & 0 & 0 \end{bmatrix} \begin{bmatrix} \beta \\ \gamma \\ \delta_0 \end{bmatrix} + \begin{bmatrix} b_{11} \\ b_{21} \\ 0 \end{bmatrix} [\delta_f].$$

Preferably, in other further embodiments, the control unit includes a desired yaw rate calculation unit for calculating a desired yaw rate $\gamma_d$ on a basis of the speed of the vehicle V which is provided by the sensor unit, information about lateral motion of the vehicle which are provided by the Kalman estimator, and a predetermined distance $L_s$ between a center of gravity of the vehicle and a Global Positioning System (GPS) installed in the vehicle;

Preferably, in still other further embodiments, the desired yaw rate calculation unit includes a first adjustment unit for calculating a lateral error value, indicating a lateral deviation from a center line of the lane, by subtracting the path error $d_s$, which is provided by the Kalman estimator, from a reference path error, and a low pass filter unit for controlling a sudden motion of the vehicle on a basis of the lateral error value which is provided by the first adjustment unit.

Preferably, in other further embodiments, the control unit includes a second adjustment unit for generating a yaw rate error $e_\gamma = \gamma - \gamma_d$, which is a difference between the desired yaw rate $\gamma_d$, provided by the desired yaw rate calculation unit, and a measured yaw rate $\gamma$, provided by the Kalman estimator; a command steering wheel angle calculation unit for calculating the command steering wheel angle using the yaw rate error $e_\gamma$, provided by the second adjustment unit, and information about lateral motion of the vehicle, provided by the Kalman estimator; and a third adjustment unit for generating the compensated command steering wheel angle, which is the sum of the command steering wheel angle $\delta_{fo}$, provided by the command steering wheel angle calculation unit, and the steering wheel contortion angle $\delta_o$, provided by the steering wheel contortion angle calculation unit.

Preferably, in other further embodiments, the system further comprises a steering contortion warning unit for providing a warning for distortion of a steering wheel using any one of a visual manner, an aural manner, and a tactual manner, or a combination thereof if a number of times that the steering wheel contortion angle $\delta_o$ exceeds a predetermined reference angle is equal to or greater than a predetermined number.

The present invention provides a method for a vehicle to remain in a lane in consideration of a steering wheel contortion angle, the method preferably comprising the steps of measuring variables for dynamic characteristics of a vehicle, and suitably estimating information about lateral motion of the vehicle using the variables for dynamic characteristics of the vehicle; calculating a steering wheel contortion angle $\delta_o$ using variables for dynamic characteristics of the vehicle and information about lateral motion of the vehicle; and calculating a desired yaw rate $\gamma_d$ using variables for dynamic characteristics of the vehicle and information about lateral motion of the vehicle, and calculating a command steering wheel angle $\delta_{fo}$ using the desired yaw rate and the information about lateral motion of the vehicle, and generating a compensated command steering wheel angle, which is a sum of the command steering wheel angle and the steering wheel contortion angle.

In preferred embodiments, the variables for dynamic characteristics include, but are not only limited to, information about a road along which the vehicle is traveling, Global Positioning System (GPS) information of the vehicle, a speed of the vehicle V, a measured yaw rate of the vehicle $\gamma$, a steering wheel angle $\delta_f$, and a side slip angle $\beta$, and information about lateral motion of the vehicle, which are estimated by a Kalman estimator, include the side slip angle $\beta$, the measured yaw rate of the vehicle $\gamma$, a path error $d_s$ and a relative path angle $\Delta\psi$.

In further preferred embodiments, the step of calculating the desired yaw rate $\gamma_d$ further includes a step of calculating a lateral error value, indicating a lateral deviation from a center line of the lane, by subtracting the path error $d_s$, which is provided by the Kalman estimator, from a reference path error, and a low pass filtering step of controlling a sudden motion of the vehicle on a basis of the lateral error value.

In still further embodiments, the step of calculating the command steering wheel angle $\delta_{fo}$ is generating a yaw rate error $e_\gamma = \gamma - \gamma_d$, which is a difference between the desired yaw rate $\gamma_d$, and the measured yaw rate $\gamma$, provided by the Kalman estimator, and calculating the command steering wheel angle using the yaw rate error $e_\gamma$, and information about lateral motion of the vehicle, provided by the Kalman estimator.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram showing the relationship between a traveling vehicle and a lane;

FIG. 2 is a conceptual diagram showing a system for keeping a lane according to the present invention;

FIG. 3 is a diagram showing variation in the path of a vehicle relative to variation in the constants of a low pass filter unit according to the present invention; and FIG. 4 is a diagram showing the comparison of the path error of a conventional lane-keeping system with the path error of the lane-keeping system according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DESCRIPTION OF THE PREFERRED EMBODIMENTS

As described herein, the present invention includes a system for keeping a vehicle in a lane in consideration of a steering wheel contortion angle, comprising an input information generation unit, a steering wheel contortion angle calculation unit, a control unit for calculating a desired yaw rate $\gamma_d$ using variables for dynamic characteristics of the vehicle and information about lateral motion of the vehicle which are provided by the input information generation unit.

In one embodiment, the input information generation unit is used for measuring variables for dynamic characteristics of a vehicle using the variables for dynamic characteristics of the vehicle.

In another embodiment, the input information generation unit is used for estimating information about lateral motion of the vehicle using the variables for dynamic characteristics of the vehicle.

In another embodiment, the steering wheel contortion angle calculation unit is used for calculating a steering wheel contortion angle $\delta_o$ using variables for dynamic characteristics of the vehicle and information about lateral motion of the vehicle.

In still another embodiment, the variables for dynamic characteristics of the vehicle and information about lateral motion of the vehicle are provided by the input information generation unit.

In another further embodiment, the system further comprises calculating a command steering wheel angle $\delta_{fo}$ using the desired yaw rate and the information about lateral motion of the vehicle, and generating a compensated command steering wheel angle.

In another embodiment of the invention the compensated command steering wheel angle is a sum of the command steering wheel angle and the steering wheel contortion angle, which is provided by the steering wheel contortion angle calculation unit.

The invention features in other aspects a method for keeping a lane in consideration of a steering wheel contortion angle, the method comprising the steps of measuring variables for dynamic characteristics of a vehicle, and estimating information about lateral motion of the vehicle using the variables for dynamic characteristics of the vehicle, calculating a steering wheel contortion angle $\delta_o$ using variables for dynamic characteristics of the vehicle and information about lateral motion of the vehicle, and calculating a desired yaw rate $\gamma_d$ using variables for dynamic characteristics of the vehicle and information about lateral motion of the vehicle, and calculating a command steering wheel angle $\delta_{fo}$ using the desired yaw rate and the information about lateral motion of the vehicle, and generating a compensated command steering wheel angle, which is a sum of the command steering wheel angle and the steering wheel contortion angle.

The present invention also includes a motor vehicle comprising the system for keeping a vehicle in a lane in consideration of a steering wheel contortion angle as described in the aspects herein.

Hereinafter, embodiments of the present invention will be described in detail with reference to the attached exemplary drawings. However, it is apparent that the technical spirit of the present invention is not limited to the exemplary embodiments of the present invention, and may extend to the range of equivalents thereof.

FIG. 1 is an exemplary diagram showing the relationship between a traveling vehicle and a lane. Referring to FIG. 1, a sensor unit according to the present invention suitably measures a location placed ahead of a vehicle by a predetermined distance, which is preferably called a measurement location. Suitably, various variables indicating the relationship between various lanes and a vehicle can be calculated on the basis of the measurement location.

In one embodiment, the variables include a path error $d_s$ indicating a difference in distance between the measurement location and a relevant lane, a relative path angle $\Delta\psi$ indicating an angle which the vehicle forms with the lane on the basis of the measurement location, a side slip angle $\beta$ indicating degrees in which the vehicle travels in a traveling direction and in a lateral direction, and the curvature of the lane $\rho_{ref}$.

FIG. 2 is an exemplary conceptual diagram of a system designed for a vehicle to stay in, or keep, a lane according to the present invention. Referring to FIG. 2, the lane-keeping system according to exemplary embodiments of the present invention may preferably include an input information generation unit for suitably generating input information such as variables for dynamic characteristics of a vehicle and information about lateral motion of the vehicle, a steering wheel contortion angle calculation unit for suitably calculating a steering wheel contortion angle $\delta_o$ using input information which are provided by the input information generating unit, and a control unit for suitably calculating a command steering wheel angle $\delta_{fo}$ using input information which are provided by the input information generating unit, and generating a compensated command steering wheel angle, which is a sum of the command steering wheel angle and the steering wheel contortion angle which is suitably provided by the steering wheel contortion angle calculation unit.

Preferably, the input information generation unit comprises a sensor unit for measuring variables for dynamic characteristics of the vehicle, a vehicle location and road curvature calculation unit for calculating a location of the vehicle, a road curvature $\rho_{ref}$ and a path error $d_s$ using the variables for dynamic characteristics of the vehicle which are provided by the sensor unit, and a Kalman estimator for suitably estimating information about lateral motion of the vehicle using the variables for dynamic characteristics of the vehicle which are provided by the sensor unit and the road curvature and the path error which are provided the vehicle location and road curvature calculation unit.

According to preferred embodiments of the invention, the sensor unit 11 measures variables for dynamic characteristics of the vehicle, required in order to control the lane keeping of the vehicle. In further particular embodiments, the variables for dynamic characteristics measured by the sensor unit 11 include, but are not limited to, information about a road along which the vehicle is traveling, Global Positioning System (GPS) information of the vehicle (for example, the current location of the vehicle), the speed of the vehicle V, estimated yaw rate of the vehicle γ, a side slip angle β, a steering wheel angle $\delta_f$, etc.

The vehicle location and road curvature calculation unit 12 calculates both the location of the vehicle and the curvature $\rho_{ref}$ of the current travel lane of the vehicle on the basis of the measured variables provided by the sensor unit 11.

In other particular embodiments, the Kalman estimator 13 realizes an observer equation for estimating information about the lateral motion of the vehicle, including, but not limited to, the side slip angle β, the measured yaw rate of the vehicle γ, the path error $d_s$ and a relative path angle Δψ, using the variables for dynamic characteristics of the vehicle, the location of the vehicle, and the curvature of the travel lane, which are provided by the sensor unit 11 and the vehicle location and road curvature calculation unit 12. In particular embodiments, the Kalman estimator can be represented by an observer equation that is configured using a state equation given by the following Equation [1], $$\begin{bmatrix} \dot{\beta} \\ \dot{\gamma} \\ \dot{\Delta\psi} \\ \dot{ds} \end{bmatrix} = \begin{bmatrix} a_{11} & a_{11} & 0 & 0 \\ a_{11} & a_{11} & 0 & 0 \\ 0 & 1 & 0 & 0 \\ V & L_s & V & 0 \end{bmatrix} \begin{bmatrix} \beta \\ \gamma \\ \Delta\psi \\ ds \end{bmatrix} + \begin{bmatrix} b_{11} & 0 \\ b_{21} & 0 \\ 0 & -V \\ 0 & 0 \end{bmatrix} \begin{bmatrix} \delta_f \\ \rho_{ref} \end{bmatrix} \quad [1]$$

where $a_{11} = -\dfrac{C_f + C_r}{\tilde{m}V}$, $a_{12} = -1 + \dfrac{C_r L_r - C_f L_f}{\tilde{m}V^2}$, $a_{21} = \dfrac{C_r L_r - C_f L_f}{I_{zz}}$, $a_{22} = -\dfrac{C_r L_r^2 + C_f L_f^2}{I_{zz}V}$, $b_{11} = \dfrac{C_f}{\tilde{m}V}$, and $b_{21} = \dfrac{C_f L_f}{I_{zz}}$.

Further, constants of respective elements can be defined as follows:

$C_f$: Cornering stiffness of the front wheel shaft of the vehicle
$L_f$: Distance from the center of gravity of the vehicle to the front wheel shaft
$C_r$: Cornering stiffness of the rear wheel shaft of the vehicle
$L_r$: Distance from the center of gravity of the vehicle to the rear wheel shaft
V: Speed of the vehicle
$\tilde{m}$: Virtual vehicle weight (weight of vehicle m/road friction coefficient μ)
$L_s$: Distance between the center of gravity of the vehicle and GPS installed in the vehicle
$I_{zz}$: Moment of inertia of the vehicle
$\delta_f$: Steering wheel angle
$\rho_{ref}$: Curvature of the lane Equation [1] can be represented by a typical state equation $\dot{x}=Ax+Bu$, which can be represented by an observer equation, that is, $$\dot{\hat{x}} = (A - LC)\hat{x} + Bu + Ly.$$

The Kalman estimator 13 of the present system may preferably receive the steering wheel angle $\delta_f$, the measured yaw rate of the vehicle γ from the sensor unit 11 and the road curvature $\rho_{ref}$, the path error $d_s$ from the vehicle location and road curvature calculation unit 12, and may calculate estimated state variables by which the eigenvalues of the matrix (A−LC) of the Kalman estimator 13 are negative values. In this way, the Kalman estimator 13 estimates a side slip angle β, a measured yaw rate γ, a path error $d_s$ and a relative path angle Δψ at each time, and then updates them. In particular embodiments, the measured yaw rate γ and the path error $d_s$, among the state variables estimated by the Kalman estimator 13, may be identical to the measured values provided by the sensor unit 11.

According to further preferred embodiments of the invention as described herein, the steering wheel contortion angle calculation unit 30 calculates the steering wheel contortion angle $\delta_o$ using variables for dynamic characteristics of the vehicle and information about lateral motion of the vehicle, which are suitably provided by the input information generation unit 10.

In particular embodiments, the steering wheel contortion angle calculation unit 30 calculates a steering wheel contortion angle $\delta_o$, which appears when wheel alignment is suitably contorted, using the side slip angle β and the yaw rate γ, which are estimated by the Kalman estimator 13, and a steering wheel angle $\delta_s$ measured by the sensor unit. In further preferred embodiments, a steering wheel contortion angle is represented by the following Equation [2].

$$\begin{bmatrix} \dot{\beta} \\ \dot{\gamma} \\ \dot{\delta}_o \end{bmatrix} = \begin{bmatrix} a_{11} & a_{12} & -b_{11} \\ a_{21} & a_{22} & -b_{21} \\ 0 & 0 & 0 \end{bmatrix} \begin{bmatrix} \beta \\ \gamma \\ \delta_0 \end{bmatrix} + \begin{bmatrix} b_{11} \\ b_{21} \\ 0 \end{bmatrix} [\delta_f] \quad [2]$$

In certain embodiments, when a state equation in Equation [2] is $\dot{x}_o = A_o x_o + B_o u_o$, the observer equation corresponding thereto is $$\dot{\hat{x}}_o = (A_o - L_o C_o)\hat{x}_o + B_o u_o + L_o y_o$$

(where $y_o = C_o x_o = [0 \ 1 \ 0]x_o$).

Preferably, the control unit 20 calculates a desired yaw rate $\gamma_d$ using variables for dynamic characteristics of the vehicle and information about lateral motion of the vehicle which are preferably provided by the input information generation unit 10, and suitably calculating the command steering wheel angle $\delta_{fc}$ using the desired yaw rate and the information about lateral motion of the vehicle, and generating the compensated command steering wheel angle, which is a sum of the command steering wheel angle and the steering wheel contortion angle which is suitably provided by the steering wheel contortion angle calculation unit 30.

In preferred embodiments of the invention, the control unit 20 includes a desired yaw rate calculation unit 23 for calculating the desired yaw rate $\gamma_d$ on a basis of the speed of the vehicle V which is suitably provided by the sensor unit 11, information about lateral motion of the vehicle which are suitably provided by the Kalman estimator 13, and a predetermined distance $L_s$ between a center of gravity of the vehicle and a Global Positioning System (GPS) suitably installed in the vehicle;

In particular embodiments, the desired yaw rate calculation unit 23 can calculate the desired yaw rate $\gamma_d$ preferably on the basis of the vehicle speed V, which is suitably provided by the sensor unit 11, the side slip angle $\beta$, the relative path angle $\Delta\psi$, and the path error $d_s$, which are estimated by the Kalman estimator 13, and the predetermined distance $L_s$ between the center of gravity of the vehicle and a GPS installed in the vehicle. In further preferred embodiments, the calculated desired yaw rate is given by the following Equation [3], $$\gamma_d = -\frac{V(\beta + \Delta\psi) + K_d d_s}{L_s} \qquad [3]$$

where $K_d$ is a constant.

Preferably, the desired yaw rate calculation unit 23 suitably includes a first adjustment unit 21 for calculating a lateral error value, indicating a lateral deviation from a center line of the lane, by subtracting the path error $d_s$, which is provided by the Kalman estimator, from a reference path error, and a low pass filter unit 22 for controlling a sudden motion of the vehicle on a basis of the lateral error value which is suitably provided by the first adjustment unit.

According to further preferred embodiments of the invention, the first adjustment unit 21 subtracts the path error $d_s$, provided by the Kalman estimator 13, from a reference path error. Accordingly, in further embodiments, the first adjustment unit 21 suitably generates an error value indicating a degree in which a traveling vehicle deviates from the center line of the lane. The reference path error is a predetermined value, which is 0 in general, but it may be another value.

Preferably, the Low Pass Filter (LPF) unit 22 can suitably control the sudden motion of the vehicle on the basis of the lateral error value, which suitably indicates lateral deviation from the center line and is provided by the first adjustment unit 21. A detailed operation of this according to certain preferred embodiments is described below with reference to exemplary FIG. 3.

FIG. 3 is a diagram showing variation in the path of the vehicle relative to variation in the constants of the LPF according to preferred embodiments of the present invention. Referring to FIG. 3, when the lateral error value of the vehicle is excessively large at the initiation of control (when the vehicle excessively deviates from the center line), the steering actuator of the vehicle does not rapidly react to such an excessively large error value, and causes a large overshoot, thus decreasing the riding comfort of the vehicle.

Therefore, the LPF unit 22 capable of attenuating such sudden variation is preferably added to the lane-keeping system. Accordingly, a characteristic equation in an s-plane, indicating the LPF unit 50, is preferably given by the following Equation [4].

$$M(s) = \frac{K_h}{s + K_h} \qquad [4]$$

Referring to Equation [4], the LPF unit 22 can adjust a degree, in which the vehicle returns to the center line of the lane using the constant $K_h$. Preferably, according to further embodiments, when the constant $K_h$ increases, the vehicle can rapidly return to the center line, whereas, when the constant $K_h$ decreases, the vehicle can slowly return to the center line.

According to further embodiments, the control unit 20 preferably includes a second adjustment unit 24 for generating a yaw rate error $e_\gamma = \gamma - \gamma_d$, which is a difference between the desired yaw rate $\gamma_d$, provided by the desired yaw rate calculation unit 23, and the measured yaw rate $\gamma$, provided by the Kalman estimator 13, a command steering wheel angle calculation unit 25 for calculating the command steering wheel angle using the yaw rate error $e_\gamma$, provided by the second adjustment unit, and information about lateral motion of the vehicle, provided by the Kalman estimator 13, and a third adjustment unit 26 for generating the compensated command steering wheel angle, which is the sum of the command steering wheel angle $\delta_{fo}$, provided by the command steering wheel angle calculation unit 25, and the steering wheel contortion angle $\delta_o$, provided by the steering wheel contortion angle calculation unit 30.

Preferably, the second adjustment unit 24 generates the yaw rate error $e_\gamma = \gamma - \gamma_d$, which is the difference between the desired yaw rate $\gamma_d$ provided by the desired yaw rate calculation unit 23 and the measured yaw rate $\gamma$ provided by the Kalman estimator 13.

According to preferred embodiments of the invention, the command steering wheel angle calculation unit 25 calculates the command steering wheel angle using input information, for example four types of input information, such as, but not limited to, the speed of the vehicle V which is provided by the sensor unit 11, the road curvature $\rho_{ref}$ which is provided by the vehicle location and road curvature calculation unit 12, the yaw rate error $e_\gamma$ which is provided by the second adjustment unit 24, and information about lateral motion of the vehicle which are provided by the Kalman estimator 13.

In particular embodiments, the following Equation [5] is an exemplary example of calculating the command steering wheel angle with the side slip angle $\beta$, the measured yaw rate of the vehicle $\gamma$, and the relative path angle $\Delta\psi$ which are preferably provided by the Kalman estimator 13.

$$\delta_f = \frac{1}{b_\delta}\left[-f(\cdot) - \frac{W_d L_s}{W_\gamma} - K_\gamma e_\gamma\right] W_d, W_\gamma \text{ and } K_\gamma > 0 \qquad [5]$$

where $b_\delta = \frac{C_f L_f}{I_{zz}} + \frac{C_f}{\tilde{m}L_s}$ and $f(\cdot) = C_\beta\beta + C_\gamma\gamma + C_\psi\Delta\psi - C_\rho\rho_{ref}$.

In detail, $$C_\beta = \frac{Va_{11} + VK_d + L_s a_{21}}{L_s} = -\frac{C_f + C_r}{\tilde{m}L_s} + \frac{VK_d}{L_s} + \frac{C_r L_r - C_f L_f}{I_{zz}},$$

$$C_\gamma = \frac{Va_{12} + V + K_d L_s + L_s a_{22}}{L_s} = \frac{C_r L_r - C_f L_f}{\tilde{m}VL_s} + K_d - \frac{C_r L_r^2 + C_f L_f^2}{I_{zz}V},$$

$$C_\psi = \frac{K_d V}{L_s}, \text{ and } C_\rho = \frac{V^2}{L_s}.$$

Further, $K_d$, $W_d$, $K_\gamma$, and $W_\gamma$ are variable control gains.

Accordingly, the command steering wheel angle calculation unit 25 suitably calculates the command steering wheel angle using the variable control gains and the control variables $C_\beta$, $C_\gamma$, $C_\psi$, and $C_\rho$.

According to further preferred embodiments, the third adjustment unit 26 suitably generates the compensated command steering wheel angle, which is the sum of the command steering wheel angle $\delta_{fo}$ provided by the command steering wheel angle calculation unit 25 and the steering wheel contortion angle $\delta_o$ provided by the steering wheel contortion angle calculation unit 30.

Preferably, the steering contortion warning unit 40 may visually, aurally or tactually provide a warning for the distortion of the steering wheel in the case where the number of times that the steering wheel contortion angle $\delta_o$ exceeds a predetermined reference angle is equal to or greater than a predetermined number.

The present invention provides a method for a vehicle to stay in a lane in consideration of a steering wheel contortion angle. According to preferred embodiments of the invention as herein described, the method comprising the steps of measuring variables for dynamic characteristics of a vehicle, and estimating information about lateral motion of the vehicle using the variables for dynamic characteristics of the vehicle, calculating a steering wheel contortion angle $\delta_o$ using variables for dynamic characteristics of the vehicle and information about lateral motion of the vehicle, and calculating a desired yaw rate $\gamma_d$ using variables for dynamic characteristics of the vehicle and information about lateral motion of the vehicle, and calculating a command steering wheel angle $\delta_{fo}$ using the desired yaw rate and the information about lateral motion of the vehicle, and generating a compensated command steering wheel angle, which is a sum of the command steering wheel angle and the steering wheel contortion angle.

Preferably, the variables for dynamic characteristics include, but are not limited to, information about a road along which the vehicle is traveling, Global Positioning System (GPS) information of the vehicle, the speed of the vehicle V, the measured yaw rate of the vehicle $\gamma$, the steering wheel angle $\delta_f$, and the side slip angle $\beta$.

In preferred embodiments, location of the vehicle, a road curvature $\rho_{ref}$ and a path error $d_s$, which are provided the vehicle location and road curvature calculation unit 12, may be used to estimate the information about lateral motion of the vehicle.

Information about lateral motion of the vehicle, which are estimated by a Kalman estimator, include the side slip angle $\beta$, the measured yaw rate of the vehicle $\gamma$, a path error $d_s$, and a relative path angle $\Delta\psi$.

Preferably, the step of calculating the desired yaw rate $\gamma_d$ further includes a step of calculating a lateral error value, indicating a lateral deviation from a center line of the lane, by subtracting the path error $d_s$, which is provided by the Kalman estimator, from a reference path error, and a low pass filtering step of controlling a sudden motion of the vehicle on a basis of the lateral error value.

Preferably, the step of calculating the command steering wheel angle $\delta_{fo}$ is generating a yaw rate error $e_\gamma = \gamma - \gamma_d$, which is a difference between the desired yaw rate $\gamma_d$ and the measured yaw rate $\gamma$, provided by the Kalman estimator, and calculating the command steering wheel angle using the yaw rate error $e_\gamma$, and information about lateral motion of the vehicle, provided by the Kalman estimator.

FIG. 4 is a graph showing the comparison of the path error of a conventional lane-keeping system with the path error of the lane-keeping system according to the present invention. Referring to FIG. 4, it can be seen that the deviation of an error in lane keeping, occurring due to the distortion of the steering wheel, can be suitably improved by the above-described steering wheel contortion angle calculation unit 30.

According to preferred embodiments of the present invention, steering control and lane keeping control for a vehicle can be performed in consideration of the steering wheel contortion angle of the vehicle, thus improving the safety and riding comfort of occupants while the vehicle is moving.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for keeping a vehicle in a lane in consideration of a steering wheel contortion angle, comprising:

an input information generation unit for measuring variables for dynamic characteristics of a vehicle, and estimating information about lateral motion of the vehicle using the variables for dynamic characteristics of the vehicle;

a steering wheel contortion angle calculation unit for calculating a steering wheel contortion angle $\delta_{f,c}$ using variables for dynamic characteristics of the vehicle and information about lateral motion of the vehicle, which are provided by the input information generation unit; and a control unit for calculating a desired yaw rate $\gamma_d$ using variables for dynamic characteristics of the vehicle and information about lateral motion of the vehicle which are provided by the input information generation unit, and calculating a command steering wheel angle $\delta_{f,c}$ using the desired yaw rate and the information about lateral motion of the vehicle, and generating a compensated command steering wheel angle, which is a sum of the command steering wheel angle and the steering wheel contortion angle which is provided by the steering wheel contortion angle calculation unit.

2. The system according to claim 1, wherein:

the input information generation unit comprises a sensor unit for measuring variables for dynamic characteristics of the vehicle;

a vehicle location and road curvature calculation unit for calculating a location of the vehicle, a road curvature $\rho_{ref}$ and a path error $d_s$ using the variables for dynamic characteristics of the vehicle which are provided by the sensor unit; and a Kalman estimator for estimating information about lateral motion of the vehicle using the variables for dynamic characteristics of the vehicle which are provided by the sensor unit and the road curvature and the path error which are provided the vehicle location and road curvature calculation unit.

3. The system according to claim 2, wherein the variables for dynamic characteristics measured by the sensor unit include information about a road along which the vehicle is traveling, Global Positioning System (GPS) information of the vehicle, a speed of the vehicle V, a measured yaw rate of the vehicle $\gamma$, a steering wheel angle $\delta_f$, and a side slip angle $\beta$.

4. The system according to claim 3, wherein information about lateral motion of the vehicle estimated by the Kalman estimator include the side slip angle $\beta$, the measured yaw rate of the vehicle $\gamma$, the path error $d_s$ and a relative path angle $\Delta\psi$.

5. The system according to claim 4, wherein:

the Kalman estimator realizes an observer equation $$\left(\dot{\hat{x}} = (A - LC)\hat{x} + Bu + Ly\right)$$

that is configured using a state equation ($\dot{x} = Ax + Bu$) represented by the following equation:

$$\begin{bmatrix} \dot{\beta} \\ \dot{\gamma} \\ \Delta\dot{\psi} \\ \dot{d}_s \end{bmatrix} = \begin{bmatrix} a_{11} & a_{11} & 0 & 0 \\ a_{11} & a_{11} & 0 & 0 \\ 0 & 1 & 0 & 0 \\ V & L_s & V & 0 \end{bmatrix} \begin{bmatrix} \beta \\ \gamma \\ \Delta\psi \\ d_s \end{bmatrix} + \begin{bmatrix} b_{11} & 0 \\ b_{21} & 0 \\ 0 & -V \\ 0 & 0 \end{bmatrix} \begin{bmatrix} \delta_f \\ \rho_{ref} \end{bmatrix}$$

the Kalman estimator receives the steering wheel angle $\delta_f$, the measured yaw rate of the vehicle $\gamma$ from the sensor unit and the road curvature $\rho_{ref}$, the path error $d_s$ from the vehicle location and road curvature calculation unit, and calculates estimated state variables by which eigenvalues of a matrix (A−LC) are negative values, thus estimating the side slip angle $\beta$, the measured yaw rate of the vehicle $\gamma$, the path error $d_s$ and the relative path angle $\Delta\psi$, where $$a_{11} = -\frac{C_f + C_r}{\tilde{m}V},\ a_{12} = -1 + \frac{C_r L_r - C_f L_f}{\tilde{m}V^2},\ a_{21} = \frac{C_r L_r - C_f L_f}{I_{zz}},$$

$$a_{22} = -\frac{C_r L_r^2 + C_f L_f^2}{I_{zz} V},\ b_{11} = \frac{C_f}{\tilde{m}V},\ \text{and}\ b_{21} = \frac{C_f L_f}{I_{zz}},\ \text{and}$$

where constants of respective elements are defined as follows:

$C_f$: cornering stiffness of a front wheel shaft of the vehicle,
$L_f$: distance from a center of gravity of the vehicle to the front wheel shaft,
$C_r$: cornering stiffness of a rear wheel shaft of the vehicle,
$L_r$: distance from a center of gravity of the vehicle to the rear wheel shaft,
V: vehicle speed,
$\tilde{m}$: virtual vehicle weight (weight of vehicle (m)/road friction coefficient ($\mu$)),
$L_s$: distance between the center of gravity of the vehicle and a GPS installed in the vehicle,
$I_{zz}$: moment of inertia of the vehicle,
$\delta_f$: steering wheel angle, and
$\rho_{ref}$: lane curvature.

6. The system according to claim 4, wherein the steering wheel contortion angle calculation unit calculates the steering wheel contortion angle using steering wheel angle $\delta_f$ which is provided by the sensor unit and the side slip angle $\beta$, the measured yaw rate of the vehicle $\gamma$ which are provided by the Kalman estimator.

7. The system according to claim 6, wherein the steering wheel contortion angle calculation unit calculates the steering wheel contortion angle using an observer equation $$\left(\dot{\hat{x}}_o = (A_o - L_o C_o)\hat{x}_o + B_o u_o + L_o y_o\right)$$

of a state equation ($\dot{x}_o = A_o x_o + B_o u_o$, where $y_o = C_o x_o = [0\ 1\ 0]x_o$) represented by the following equation:

$$\begin{bmatrix} \dot{\beta} \\ \dot{\gamma} \\ \dot{\delta}_o \end{bmatrix} = \begin{bmatrix} a_{11} & a_{12} & -b_{11} \\ a_{21} & a_{22} & -b_{21} \\ 0 & 0 & 0 \end{bmatrix} \begin{bmatrix} \beta \\ \gamma \\ \delta_o \end{bmatrix} + \begin{bmatrix} b_{11} \\ b_{21} \\ 0 \end{bmatrix} [\delta_f].$$

8. The system according to claim 4, wherein the control unit includes a desired yaw rate calculation unit for calculating a desired yaw rate $\gamma_d$ on a basis of the speed of the vehicle V which is provided by the sensor unit, information about lateral motion of the vehicle which are provided by the Kalman estimator, and a predetermined distance $L_s$ between a center of gravity of the vehicle and a Global Positioning System (GPS) installed in the vehicle.

9. The system according to claim 8, wherein the desired yaw rate calculation unit includes a first adjustment unit for calculating a lateral error value, indicating a lateral deviation from a center line of the lane, by subtracting the path error $d_s$, which is provided by the Kalman estimator, from a reference path error, and a low pass filter unit for controlling a sudden motion of the vehicle on a basis of the lateral error value which is provided by the first adjustment unit.

10. The system according to claim 8, wherein:
the control unit includes a second adjustment unit for generating a yaw rate error $e_\gamma = \gamma - \gamma_d$, which is a difference between the desired yaw rate $\gamma_d$, provided by the desired yaw rate calculation unit, and the measured yaw rate $\gamma$, provided by the Kalman estimator;
a command steering wheel angle calculation unit for calculating the command steering wheel angle using the yaw rate error $e_\gamma$, provided by the second adjustment unit, and information about lateral motion of the vehicle, provided by the Kalman estimator; and
a third adjustment unit for generating the compensated command steering wheel angle, which is the sum of the command steering wheel angle $\delta_{f,c}$, provided by the command steering wheel angle calculation unit, and the steering wheel contortion angle $\delta_o$, provided by the steering wheel contortion angle calculation unit.

11. The system according to claim 1, further comprising a steering contortion warning unit for providing a warning for distortion of a steering wheel using any one of a visual manner, an aural manner, and a tactual manner, or a combination thereof if a number of times that the steering wheel contortion angle $\delta_o$ exceeds a predetermined reference angle is equal to or greater than a predetermined number.

12. A method for keeping a lane in consideration of a steering wheel contortion angle, the method comprising the steps of:
measuring, by an input information generation unit, variables for dynamic characteristics of a vehicle, and estimating information about lateral motion of the vehicle using the variables for dynamic characteristics of the vehicle;
calculating, by a steering wheel contortion angle calculation unit, a steering wheel contortion angle $\delta_o$ using variables for dynamic characteristics of the vehicle and information about lateral motion of the vehicle; and
calculating, by a control unit, a desired yaw rate $\gamma_d$ using variables for dynamic characteristics of the vehicle and information about lateral motion of the vehicle, and calculating a command steering wheel angle $\delta_{f,c}$ using the desired yaw rate and the information about lateral motion of the vehicle, and generating a compensated command steering wheel angle, which is a sum of the command steering wheel angle and the steering wheel contortion angle.

13. The method according to claim 12, wherein the variables for dynamic characteristics include information about a road along which the vehicle is traveling, Global Positioning System (GPS) information of the vehicle, a speed of the vehicle V, a measured yaw rate of the vehicle $\gamma$, a steering wheel angle $\delta_f$ and a side slip angle $\beta$, and information about lateral motion of the vehicle, which are estimated by a Kalman estimator, include the side slip angle $\beta$, the measured yaw rate of the vehicle $\gamma$, a path error $d_s$ and a relative path angle $\Delta\psi$.

14. The method according to claim 13, wherein the step of calculating the desired yaw rate $\gamma_d$ further includes a step of calculating a lateral error value, indicating a lateral deviation from a center line of the lane, by subtracting the path error $d_s$, which is provided by the Kalman estimator, from a reference path error, and a low pass filtering step of controlling a sudden motion of the vehicle on a basis of the lateral error value.

15. The method according to claim 14, wherein the step of calculating the command steering wheel angle $\delta_{f,c}$ is generating a yaw rate error $e_\gamma = \gamma - \gamma_d$, which is a difference between the desired yaw rate $\gamma_d$ and the measured yaw rate $\gamma$, provided by the Kalman estimator, and calculating the command steering wheel angle using the yaw rate error $e_\gamma$, and information about lateral motion of the vehicle, provided by the Kalman estimator.

16. A motor vehicle comprising the system for keeping a vehicle in a lane in consideration of a steering wheel contortion angle comprising:

an input information generation unit for measuring variables for dynamic characteristics of a vehicle, and estimating information about lateral motion of the vehicle using the variables for dynamic characteristics of the vehicle;

a steering wheel contortion angle calculation unit for calculating a steering wheel contortion angle $\delta_o$ using variables for dynamic characteristics of the vehicle and information about lateral motion of the vehicle, which are provided by the input information generation unit; and a control unit for calculating a desired yaw rate $\gamma_d$ using variables for dynamic characteristics of the vehicle and information about lateral motion of the vehicle which are provided by the input information generation unit, and calculating a command steering wheel angle $\delta_{fc}$ using the desired yaw rate and the information about lateral motion of the vehicle, and generating a compensated command steering wheel angle, which is a sum of the command steering wheel angle and the steering wheel contortion angle which is provided by the steering wheel contortion angle calculation unit.

* * * * *